United States Patent [19]
Klos et al.

[11] Patent Number: 5,907,554
[45] Date of Patent: May 25, 1999

[54] METHOD FOR TRANSMITTING DIGITAL DATA

[75] Inventors: Reiner Klos, Ettlingen; Herbert Hetzel, Weingarten; Patrick Heck, Durmersheim, all of Germany

[73] Assignee: Becker GmbH, Karlsbad, Germany

[21] Appl. No.: 08/595,804

[22] Filed: Feb. 2, 1996

[30] Foreign Application Priority Data

Feb. 2, 1995 [DE] Germany .......................... 195 03 210

[51] Int. Cl.⁶ .................................................. H04L 12/43
[52] U.S. Cl. .......................................................... 370/460
[58] Field of Search ..................................... 370/340, 460, 370/458, 258, 506, 403, 404, 424, 452; 340/825.05; 395/200.81

[56] References Cited

U.S. PATENT DOCUMENTS

| | | | |
|---|---|---|---|
| 5,084,871 | 1/1992 | Carn et al. ............................. | 370/94.1 |
| 5,412,652 | 5/1995 | Lu ............................................ | 370/376 |
| 5,485,459 | 1/1996 | Van Steenbrugge ................... | 370/85.4 |
| 5,627,826 | 5/1997 | Kameda et al. ........................ | 370/371 |

*Primary Examiner*—Ajit Patel
*Assistant Examiner*—Chiho Andrew Lee
*Attorney, Agent, or Firm*—Laurence A. Greenberg; Herbert L. Lerner

[57] ABSTRACT

A method for transmitting digital data over data lines between subscribers forming data sources and data sinks and being disposed in a network having a ring structure and connecting a plurality of subscribers to one another with network segments each being formed between two adjacent subscribers, includes transmitting the data in the network in a format specifying a clocked sequence of individual bit groups of equal length, each including at least one partial bit group forming a data channel to be assigned temporarily to two subscribers in the network for a data transmission. A temporary allocation of the data channels for a data transmission between two subscribers takes place segmentally in the network, for optimal utilization of the data transmission capacity of the network only those network segments that are located between the applicable data source and the associated data sink are occupied for the particular data transmission.

14 Claims, 4 Drawing Sheets

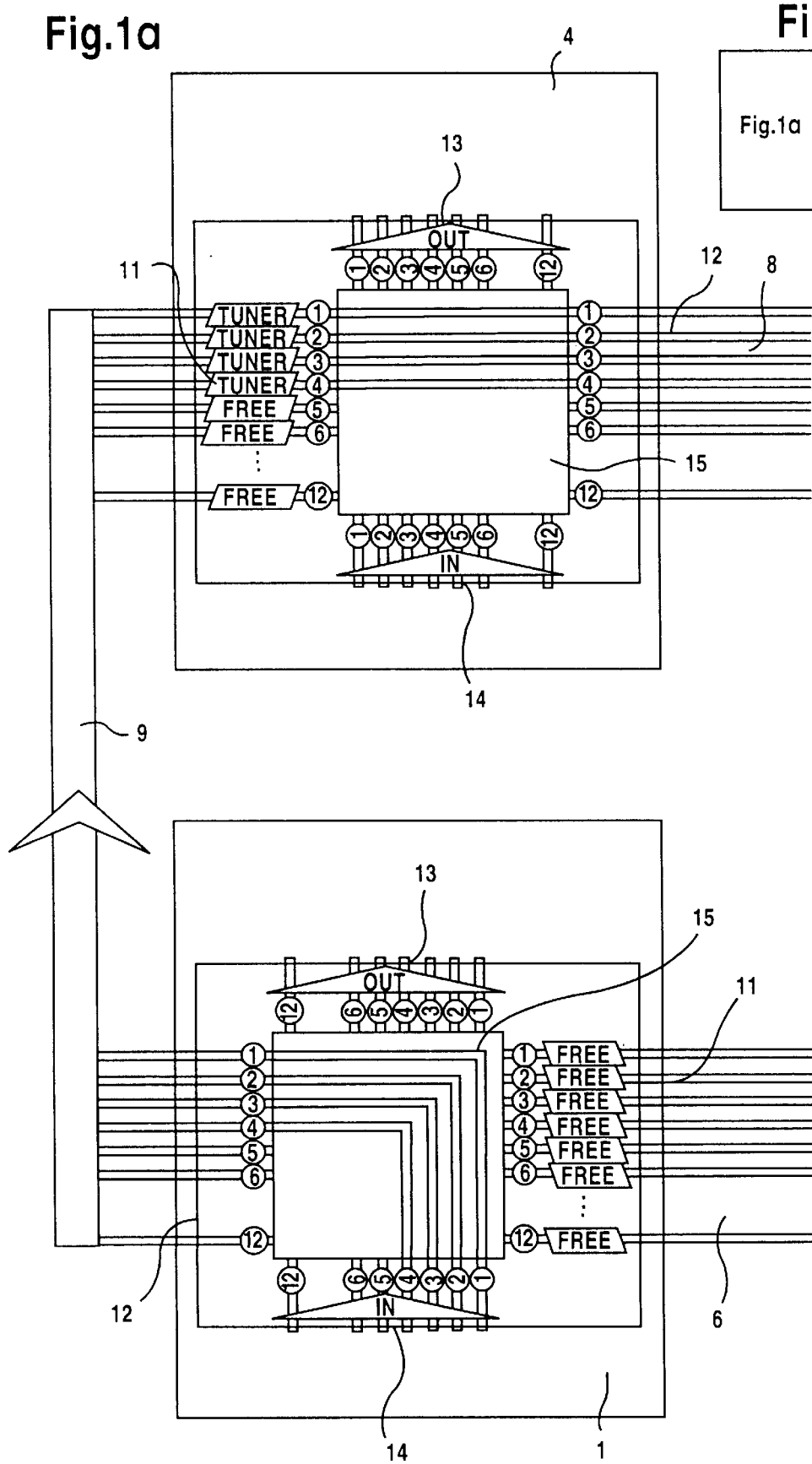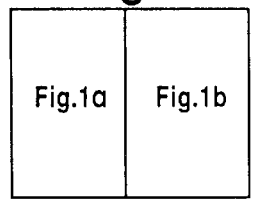

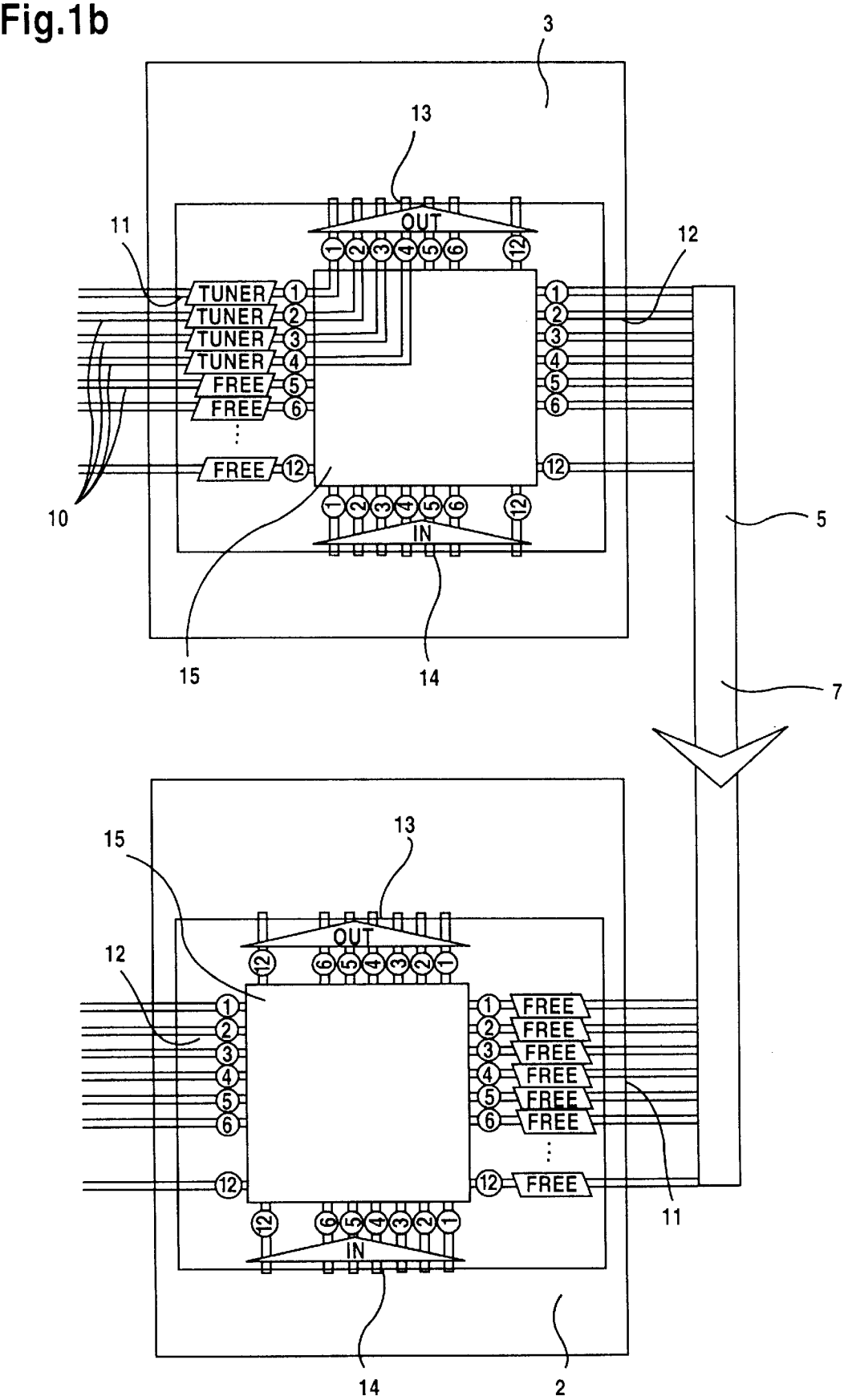

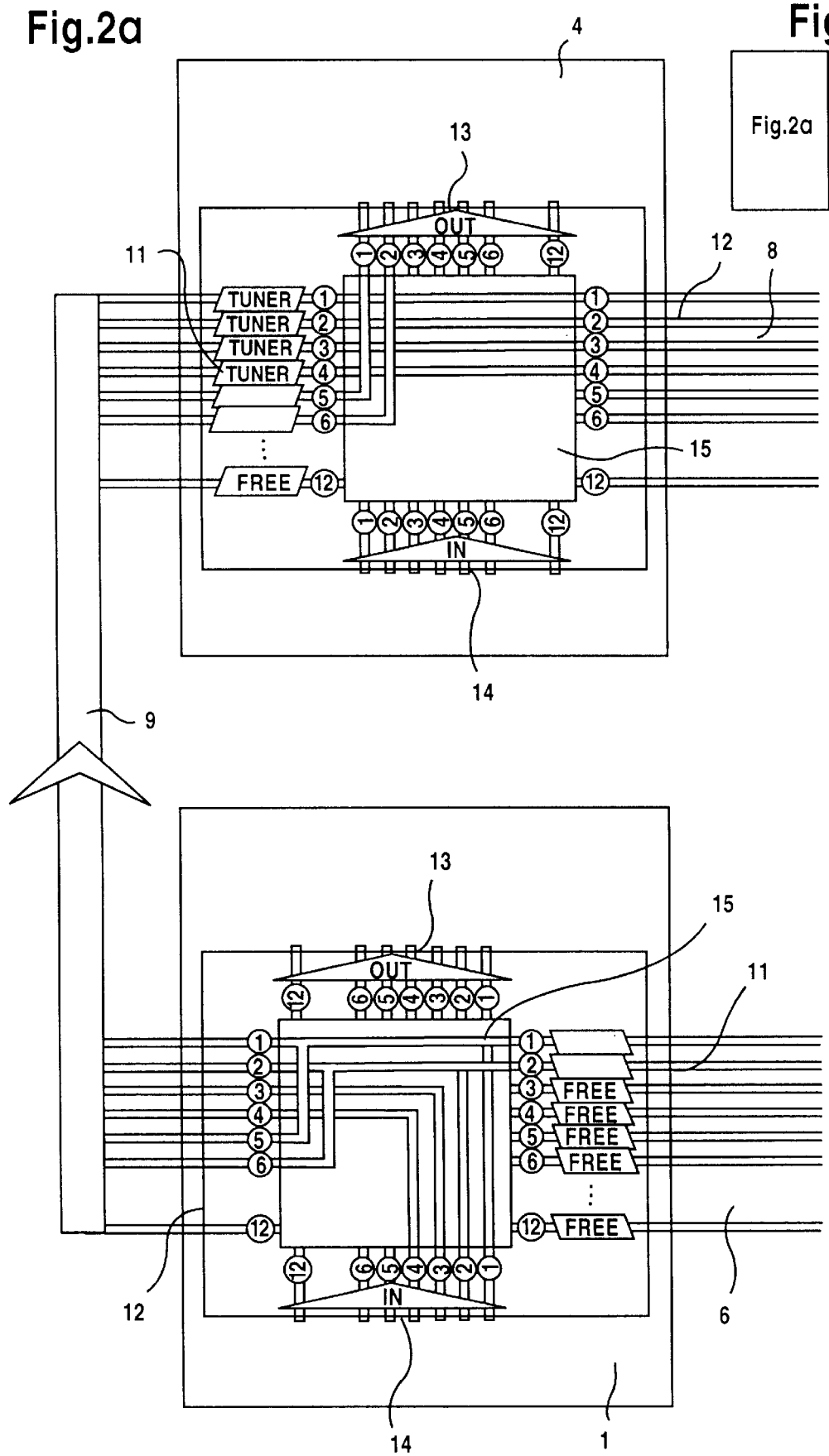

METHOD FOR TRANSMITTING DIGITAL DATA

BACKGROUND OF THE INVENTION

Field of the Invention

The present invention relates to a method for transmitting digital data over data lines between subscribers forming data sources and data sinks and being disposed in a network having a ring structure and connecting a plurality of subscribers to one another, including network segments with a single data line each being formed between two adjacent subscribers, which includes transmitting the data in the network in a format specifying a clocked sequence of individual bit groups of equal lengths each including at least one partial bit group forming a data channel being assignable temporarily to two subscribers in the network for a data transmission. The data are transferred in a continuous data stream which is synchronous to a clock signal. The clock signal is generated by a single subscriber. All other subscribers synchronize themselves to that clock signal. Purely asynchronous data transmision methods have to be differentiated therefrom as packet or package-oriented data transmission methods, for example ATM-methods.

Methods of that type are used wherever a plurality of electrical and electronic devices that are to exchange information with one another are interlinked through the use of data lines. In the audio fields for instances the communication between interlinked data sources on one hand, such as CD players, radio receivers and cassette tape recorders, and the associated data sinks on the other hand, such as an amplifier-speaker combination, can be controlled by such a method.

In known methods of that type, the existing data channels for data transmission are each assigned temporarily, in other words for a certain data transmission, to the two subscribers involved in the network, that is the data source and the data sink. In a network with a ring structure, those two data channels are blocked in the entire network for the entire duration of the transmission of data between those two subscribers. In other words, other data transmissions can be made only through further data channels, even if those two subscribers are not involved in the other data transmissions.

That has the disadvantage of requiring that a large number of data channels be kept available, if a plurality of data transmissions are to be possible simultaneously between different subscribers in the network. That entails considerable expense for equipment and administration. If there is a fixedly specified number of data channels available in the network for data transmissions, then the transmission capacity, that is the number of simultaneously possible transmissions between different subscribers in the network, is also limited.

SUMMARY OF THE INVENTION

It is accordingly an object of the invention to provide a method for transmitting digital data, which overcomes the hereinafore-mentioned disadvantages of the heretofore-known methods of this general type, in such a way that existing data channels can be better utilized and that the number of data channels required for a desired transmission capacity can be reduced.

With the foregoing and other objects in view there is provided, in accordance with the invention, a method for transmitting digital data over data lines between subscribers forming data sources and data sinks and being disposed in a network having a ring structure and connecting a plurality of subscribers to one another with network segments each being formed between two adjacent subscribers, which includes transmitting the data in the network in a format specifying a clocked sequence of individual bit groups of equal length, each including at least one partial bit group forming a data channel to be assigned temporarily to two subscribers in the network for a data transmission, which comprises temporarily allocating the data channels for a data transmission between two subscribers segmentally in the network; and occupying only those network segments being located between the applicable data source and the associated data sink for the particular data transmission.

In accordance with another mode of the invention, the segmental occupation of a data channel by the applicable data source which outputs the data and the associated data sink is effected in such a way that the data source identifies this data channel as being occupied and the data sink cancels the occupation of this channel for the segments that follow it. In this mode, the administration of the data transmission or in other words the occupation of the data channels does not take place centrally. Instead, all of the subscribers in the network are involved in administration in the manner described.

This mode has the advantage of not requiring an additional device for administration. Moreover, the expense for administration is reduced, since each subscriber needs to identify only its local data channel allocations. Conversely, a central administration unit would have to identify all of the data channel allocations in all of the segments and would require a corresponding amount of space in memory. In order to enable expansion of the network, such a central administration unit would also have to be constructed for a maximum occupation rate, which further increases the required amount of memory capacity. However, this is unnecessary in the decentralized administration according to the invention. In principle, an arbitrary expansion of the network is possible without already having to furnish memory capacity therefor in the basic network.

In accordance with a further mode of the invention, the occupied data channels receive an identification code that indicates the data source from which the data were sent.

In accordance with an added mode of the inventions the segmental channel occupation and the later freeing up, or clearance, of occupied channels is initiated by a control unit, which sends the initiation or clearance command through the network to the applicable subscriber, that thereupon executes the channel occupation or clearance.

In accordance with an additional mode of the invention, the initiation and clearance command originating at the control unit is transmitted from subscriber to subscriber, and each subscriber checks whether it has been designated in the applicable command as a data source or data sink and trips the corresponding function as applicable. The data source which receives the initiation command accordingly occupies the required number of channels, provides them with its address and passes the thus-amended command on to the following subscribers. The data sink connects the channels associated with it to its corresponding input, cancels the channel occupation and passes the thus-amended command onward again, which then ends at the control unit. All of the other subscribers merely pass the command on and identify the occupied channels as applicable.

In accordance with yet another mode of the invention, there is provided a common control unit with a user interface acts as the control unit. Such a common control unit may, for example, be a so-called audio-video control unit, or AVC for short, as is often currently used in networks.

In accordance with yet a further mode of the invention, once successful channel occupation or successful channel clearance has occurred, the applicable data sink sends a confirmation signal to the associated data source and optionally to the common control unit. In this way, the successful channel occupation or channel clearance is monitored, and a channel allocation is concluded. The data transmission can then be begun, and the common control unit can initiate further channel occupations.

In accordance with yet an added mode of the invention, if a connection cannot be made between a data source and the associated data sink, or can be made only with an inadequate number of channels, then an error signal is preferably generated and sent to the applicable data source and optionally to the common control unit.

As a result, an erroneous channel allocation is rapidly ascertained, and the data source or the common control unit is informed thereof. After being so informed, a decision can then be made as to whether the data transmission should take place over fewer channels, or other data transmissions should be interrupted in order to make enough data channels available. However, an error report can also be sent to the user, indicating the impossibility of the data transmission.

In accordance with yet an additional mode of the invention, the data channels used for a data transmission between two subscribers in the ring can be freely selected from the existing data channels. This feature enables optimal utilization of the existing data channels, since if a data channel in the network segments between the data source and the data sink is already occupied, a change can be made to another data channel, which is not yet occupied, in these segments. In all of the segments, all of the data channels can thus advantageously be used for arbitrary data transmissions.

In accordance with a concomitant mode of the invention, this freedom of channel selection can also be utilized in order to forward data, arriving over one certain data channel, to another data channel. For instance, if a subscriber receives data over a first data channel that is already occupied by that subscriber itself, and the data are not intended for it but instead are to be passed onward, then it can pass the data onward over another free channel, for instance a second data channel. In this way, the data channels in the segments are even better utilized, and accordingly the data transmission capacity of the network is further increased.

Other features which are considered as characteristic for the invention are set forth in the appended claims.

Although the invention is illustrated and described herein as embodied in a method for transmitting digital data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic circuit diagram of a network with a ring structure in a certain data transmission state.

DESCRIPTION OF THE PREFERRED EMBODIMENTS

Figure 2B:
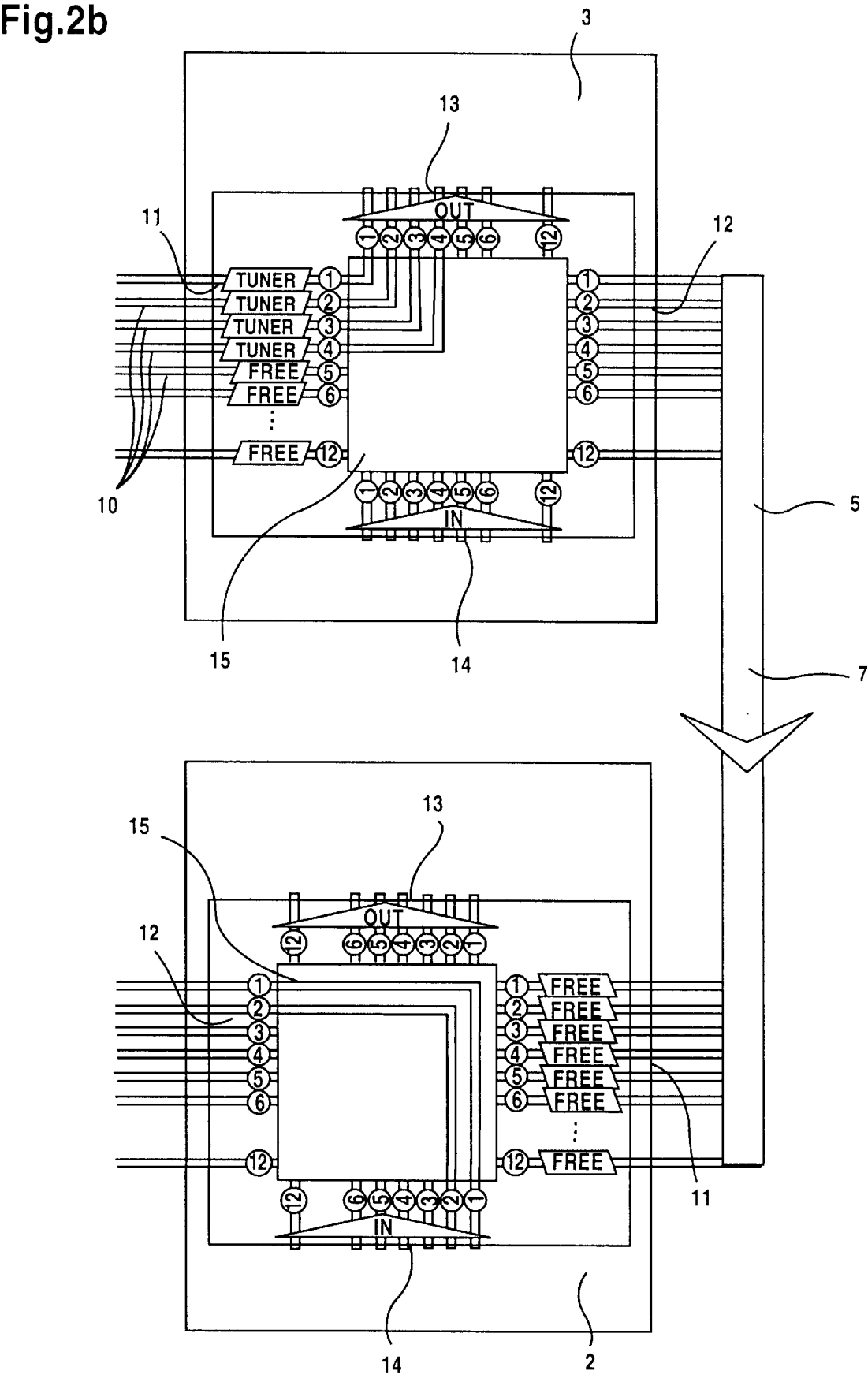
FIG. 2 is a circuit diagram of the same network in another data transmission state.

Referring now in detail to FIGS. 1 and 2 of the drawing as a whole, there is seen a network which includes four subscribers 1–4 connected in a ring. These four subscribers are, by way of example, a radio receiver 1 and a CD player 2 as data sources, as well as an amplifier 3 and an audio-video control unit 4 as data sinks. However, it is also possible for all of the data sources to simultaneously be data sinks and for all of the data sinks to simultaneously be data sources, for instance for control data.

The four subscribers 1–4 communicate with one another over a data line 5, which by way of example is an optical fiber. The data line 5 is composed of four segments 6, 7, 8 and 9, which are each formed by a portion of the data line 5 between two of the four subscribers 1–4. Data transmission takes place in the direction indicated by arrows.

In the example shown, twelve data channels are available for the data transmission over the data line 5. For the sake of simplicity, the data channels are shown in this case as lines 10 extending parallel to one another, but in actual fact they are in the form of partial bit groups in a clocked sequence of serially transmitted bit groups of equal length.

Each of the subscribers 1–4 has a network data input 11 and a network data output 12 as well as an internal data input 13 and an internal data output 14. All twelve data channels can be individually connected arbitrarily between the inputs and outputs 11, 12, 13 and 14 of a subscriber 1–4 through a control unit 15 that includes an allocation specification.

In the example shown in FIG. 1, the first four channels of the internal output 14 of the subscriber 1 are connected to the network output 12 of that subscriber. Accordingly, from that subscriber onward, the first four data channels of the network are occupied, which is indicated by shading of the corresponding lines 10. In the subscriber 4 which is located downstream in terms of the data flow from the subscriber 1, the first four data channels of the network input are connected to the first four data channels of the network output. In other words, the data are simply passed through these subscribers. In the next subscriber 3, the first four data channels of the network input 11 are connected to the first four data channels of the internal input 14 of that subscriber. As is seen downstream in terms of data flow from this subscriber, the first four data channels of the network are accordingly free again, as is represented by light lines 10.

The subscriber 1, which in the example shown is a radio receiver, accordingly represents the data source, that by way of example transmits stereo audio data over the first four data channels of the network to the subscriber 3, which in the example shown is an amplifier. Thus the subscriber 1 occupies the first four data channels of the network in the network segments 9 and 8 that follow it, and the subscriber 3 clears these data channels again for the network segments 7 and 6 that follow it. Between the subscriber 3 and the subscriber 1, all of the data channels are therefore once again free and are available for other data transmissions.

FIG. 2 shows a data transmission situation in which once again stereo audio data are transmitted from the subscriber 1 to the subscriber 3 over the first four data channels of the network. In addition, a data transmission takes place from the subscriber 2 to the subscriber 4. The subscriber 2, which is a CD changer, transmits navigational data, for instance, to the audio-video control unit 4. To that end, it occupies the first two data channels of the network, which is again indicated by shading of the corresponding lines 10, by connecting the first two data channels of its internal output 14 to the first two data channels of its network output 12. The radio receiver 1 which is located downstream in terms of data flow from the CD changer 2 receives these data over the first two data channels of its network input 11 as well. The subscriber 1 ascertains that the first two data channels of its network output 12 are already occupied, and it shifts the data arriving from the CD changer 2 to the next two free data channels 5 and 6 of its network output 12.

The audio-video control unit 4 for which the data transmitted from the CD changer 2 are intended, connects the data channels 5 and 6 of its network input 11 with the first data channels of its internal data input 13. The resultant pattern is as follows: In the network segment 6 between the CD changer 2 and the radio receiver 1, the first two data channels are occupied, while all of the other data channels are free; in the network segment 9 between the radio receiver 1 and the audio-video control unit 4, the first six data channels are occupied, while the other six data channels are free; in the network segment 8 between the audio-video control unit 4 and the amplifier 3, the first four data channels are occupied, while the other eight data channels are free; and in the last network segment 7 between the amplifier 3 and the CD changer 2, all twelve data channels are free. In this way, optimal utilization of the data channels in the data network that are available for data transmission is achieved. It is only between a data source and an associated data sink that the data channels required for a certain data transmission are in fact occupied. In all of the other segments, these data channels are conversely free and are available for other data transmissions. In the segment 7 between the amplifier 3 and the CD changer 2, for instance in the example shown in FIG. 2, all of the data channels could be used for a data transmission even though the data channels 1–6 in other segments of the network are occupied.

In order for the data sent by a data source to reach the correct data sink and for the channels used in the transmission to be freed up again by it, the data are provided with an address of the sender.

The initiation of a data transmission can originate either at each subscriber 1–4 itself or at a common control unit, preferably the audio-video control unit 4. In that case, the audio-video control unit 4 sends a control command through the network in which the data connection to be made is transmitted. The data source which is addressed occupies the required data channels in the network and transmits the data to the data sink once the data sink has confirmed that the data connection has been made. The data sink clears the channels used for the data transmission between the data source and itself, for the network segments that follow it.

If problems arise when an attempt is made at making a data connection, resulting from the fact that there are no longer enough free data channels in a certain segment for the desired data connection, then the subscriber in the network that ascertains this sends a corresponding error report to the data source and optionally to the common control unit. The data source or the common control unit can then react to this, for instance by initiating a data transmission with fewer channels or by initiating a clearance of other channels or by outputting an error report to the user.

The termination of a data transmission is also initiated by a corresponding control command, which is transmitted through the data source or the common control unit over the network to the applicable subscribers. The data source terminates the data transmission and clears the channels occupied for the data transmission. The data source ascertains the termination of the data transmission and transmits a conformation command to the control source and optionally to the common control unit.

The network transmission capacity can be optimally utilized through the use of the segmental channel occupation described above in a ring-structure network and through the use of the decentralized administration.

We claim:

1. In a method for transmitting one of digital audio and video data over data lines between subscribers forming data sources and data sinks for one of the audio and video data and disposed in a ring network connecting a plurality of subscribers to one another with network segments each formed between two adjacent subscribers, which includes transmitting one of the audio and video data in the ring network in a format specifying a clocked sequence of individual bit groups of equal length forming a data channel for transmission of one of the audio and video data to be assigned temporarily to two subscribers in the ring network for a data transmission, the improvement which comprises:

providing, in each of the individual bit groups of equal length, at least one partial bit group forming a data channel for transmission of one of the audio and video data to be assigned temporarily to two subscribers in the ring network for a data transmission;

generating a special control command by any one of the subscribers participating in the data transmission and temporarily allocating the data channels for a data transmission between two subscribers segmentally in the ring network with the special control command; and occupying only those network segments being located between the applicable data source and the associated data sink for the particular data transmission.

2. The method according to claim 1, which comprises carrying out the segmental occupation of a data channel by the applicable data source outputting the data and the associated data sink by causing the data source to identify that data channel as being occupied for the segments located downstream of it in terms of data flow, and causing the data sink to identify that channel as being free again for the segments that follow it.

3. The method according to claim 1, which comprises applying an identification code to occupied data channels for indicating the data source from which the data were sent.

4. The method according to claim 1, which comprises initiating at least one of a segmental channel occupation and a channel clearance with a control unit sending an initiation or a clearance command through the ring network to the applicable subscriber thereupon executing the channel occupation or the clearance.

5. The method according to claim 4, which comprises transmitting the initiation and clearance commands originating at the control unit from subscriber to subscriber, causing each subscriber to check whether it is designated in the applicable command as a data source or a data sink and tripping a corresponding function as applicable.

6. The method according to claim 4, which comprises using a common control unit as the control unit.

7. The method according to claim 4, which comprises using a common control unit having a user interface as the control unit.

8. The method according to claim 4, which comprises using a common audio-video control unit as the control unit.

9. The method according to claim 4, which comprises sending a confirmation signal from the applicable data sink to the associated data source once successful channel occupation or successful channel clearance has occurred.

10. The method according to claim 6, which comprises sending a confirmation signal from the applicable data sink to the associated data source and to the common control unit once successful channel occupation or successful channel clearance has occurred.

11. The method according to claim 4, which comprises generating and sending an error signal to the applicable data source if it is impossible or only possible only with an inadequate number of channels to make a connection between that data source and the associated data sink.

12. The method according to claim 4, which comprises generating and sending an error signal to the applicable data source and to the common control unit if it is impossible or only possible only with an inadequate number of channels to make a connection between that data source and the associated data sink.

13. The method according to claim 1, which comprises freely selecting at least one of the data channels used for a data transmission between two subscribers in the ring from the existing data channels.

14. The method according to claim 13, which comprises forwarding data received by a subscriber on a given data channel of the network from the subscriber over another data channel, if the given data channel has already been occupied for a data transmission by that subscriber.

* * * * *